(No Model.) 2 Sheets—Sheet 1.
F. L. McGAHAN.
APPARATUS FOR SUPPLYING PURE WATER TO STEAM BOILERS.
No. 439,788. Patented Nov. 4, 1890.
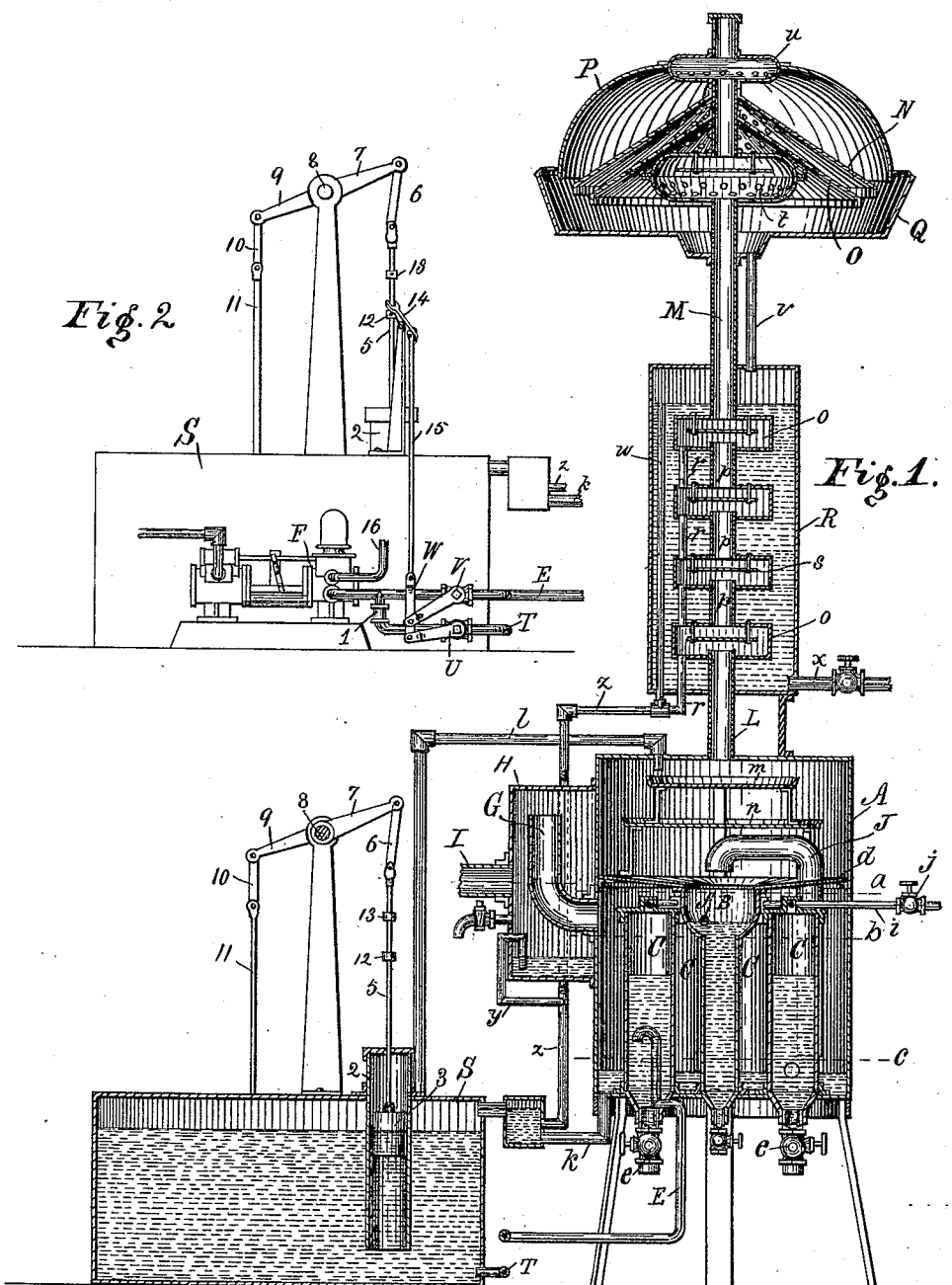

(No Model.) 2 Sheets—Sheet 2.
F. L. McGAHAN.
APPARATUS FOR SUPPLYING PURE WATER TO STEAM BOILERS.
No. 439,788. Patented Nov. 4, 1890.
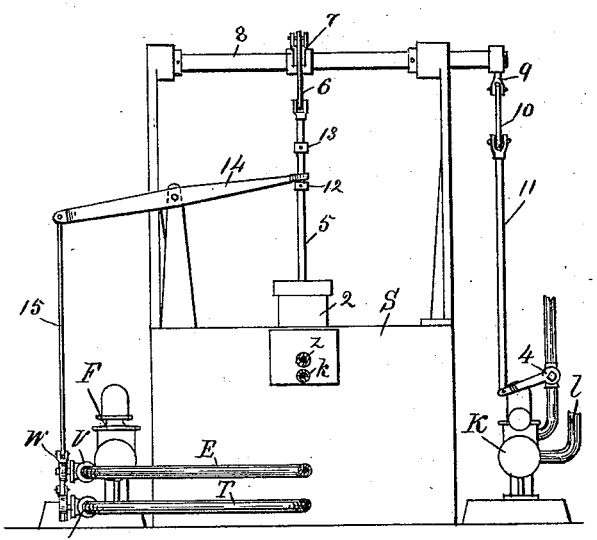
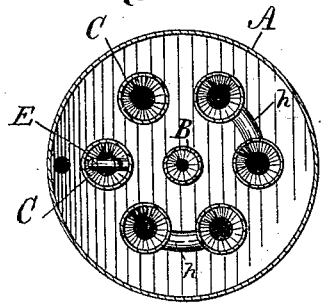
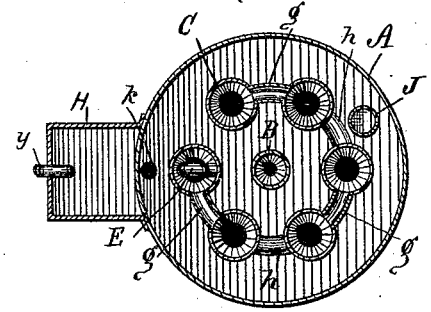
Witnesses
V. M. Hood.
A. M. Hood.
Inventor:
Fred. L. McGahan.
By His Attorney
H. P. Hood.

UNITED STATES PATENT OFFICE.

FRED. L. McGAHAN, OF INDIANAPOLIS, INDIANA.

APPARATUS FOR SUPPLYING PURE WATER TO STEAM-BOILERS.

SPECIFICATION forming part of Letters Patent No. 439,788, dated November 4, 1890.

Application filed August 5, 1890. Serial No. 361,085. (No model.)

*To all whom it may concern:*

Be it known that I, FRED. L. McGAHAN, a citizen of the United States, residing at Indianapolis, in the county of Marion and State of Indiana, have invented a new and useful Apparatus for Supplying Pure Water to Steam-Boilers, of which the following is a specification.

My invention relates to an improved apparatus for supplying pure water for steam-boilers and other purposes.

The objects of my improvement are, first, to provide means for condensing all of the exhaust-steam from an engine; second, to utilize to the best advantage the heat given off in the process of condensation for heating and purifying feed-water obtained from a source of original supply, as a well; third, to provide means for quickly discharging from the apparatus the impurities precipitated from said feed-water, and, fourth, to provide means whereby the supply of original feed-water shall be automatically controlled by the amount of condense-water formed, so that the original feed-water shall only be supplied and drawn from when the supply of condense-water has been practically exhausted, all as hereinafter fully described.

The accompanying drawings illustrate my invention.

Figure 1 represents a central vertical section. Fig. 2 represents a side elevation of the hot-water tank, the hot-water pump, and connections. Fig. 3 represents an end view of the hot-water tank, the hot and cold water pumps, and their connections. Figs. 4, 5, and 6 represent transverse sections of the purifier at $a$, $b$, and $c$, respectively.

Wherever the term "original feed-water" is used in this specification it shall be understood to mean cold water drawn from a well or other source of original supply, and wherever the term "condense-water" is used it shall be understood to mean condensed steam.

In the drawings, A is a closed tank, of boiler-iron, having a transverse partition $d$ and a central cylindrical well B. Arranged around the central well B, between it and the walls of the tank and below the partition $d$, is a series of settling-chambers, consisting of closed cylindrical vessels C. The bottom of each of the vessels C is funnel-shaped, and is closed by a valve $e$. The first of the series of vessels C is connected near its top with the central well B through a pipe $f$ and with the next of the series through a pipe $g$, also near its top. The remaining vessels of the series are connected with the first and with each other alternately at the top and bottom by pipes $g$ and $h$, so that the original feed-water passes from well B into the first of vessels C, and through said vessels in succession to the last, from whence it is drawn out through the pipe E by the hot-water pump F.

For the purpose of quickly and easily cleaning out of the settling-chambers C the sediment and lime compounds precipitated from the original feed-water, I connect all of the chambers C at the top with a steam-pipe $i$, leading directly from a steam-boiler, which pipe is normally kept closed by a valve $j$. By this means on opening valve $j$ and the valves $e$ at the bottoms of the chambers the sediment can all be blown out by direct steam-pressure.

For the purpose of heating the original feed-water to that temperature where it will precipitate the lime compounds and like impurities contained therein, exhaust-steam from the engine is admitted to the lower part of tank A through the pipe G, the steam having first entered the grease-trap H through pipe I. The steam fills the space around the chambers C and central well B and then passes to the upper part of the tank A through the pipe J, which extends nearly to the bottom of the tank, and discharges at the upper end immediately over the central well B. By this arrangement the steam is retained in the lower part of tank A around the settling-chambers until the water therein is thoroughly heated and a portion of the steam is condensed, the condense-water collecting at the bottom of the tank and passing off through pipe $k$, as hereinafter more fully explained.

The original feed-water is supplied to the upper part of tank A through a supply-pipe $l$, leading from the cold-water pump K, Fig. 3, and falls into the distributing-pans $m$ $n$, and from thence on to the partition $d$, from whence it flows into the central well B.

One of the purposes of this invention is to prevent the escape of exhaust-steam into the atmosphere and to collect the condense-water therefrom for use as feed-water for the boiler. For this purpose I extend upward from the top of tank A an escape-pipe L, leading to a series of condensing-chambers o o, arranged one above the other. Condensing-chambers o are connected by short sections of pipe p, forming extensions of pipe L, and by drain-pipes r, the arrangement being such that pipes p project a short distance into the bottoms of the condensing-chambers, so as to compel the condense-water formed therein to flow out through the drain-pipes r. Each of the condensing-chambers is provided with a deflecting-plate s for the purpose of distributing steam thoroughly through the chamber. An escape-pipe M leads upward from the uppermost of the chambers o and terminates in one or more perforated expansion-chambers t u. Secured to pipe M, above the expansion-chamber t, are a series of cone-shaped perforated deflectors N and O, and above these is a condensing-hood P, arranged to cover and inclose the expansion-chambers t and u and deflectors N and O. A drip-pan Q is arranged below the condensing-hood and deflectors, so as to receive the condense-water therefrom. The drip-pan and all above it are designed to be set on the roof of the engine-house or elsewhere, so as to be exposed to a free circulation of air. For the purpose of assisting the condensation in chambers o they are inclosed in a tank R, into which the condense-water collected in pan Q is conducted by a pipe v. When the water rises in tank R sufficiently to cover the uppermost chamber o, the rest passes out through an overflow-pipe w. Tank R is provided with a normally-closed outlet-pipe x, so that in case of emergency all the water may be drawn out to fill a boiler.

It is the purpose in this apparatus to supply the steam-boiler or other receptacle with which it may be connected with condense-water principally, using only so much of original feed-water as may be necessary to complete the supply and to control said supply automatically. For this purpose I drain all of the condense-water from the lower part of tank A, grease-trap H, and condensing-chambers o and the overflow from tank R through pipes k, y, and z into a hot-water tank S. Tank S is connected with the inlet-pipe of the hot-water pump F through a pipe T, having a cut-off valve U and a check-valve at 1. The inlet-pipe of pump F is also connected with the last settling-chamber C through pipe E, having a cut-off valve V. The levers for operating valves U and V are so connected by a link W that when one valve is closed the other will be open. Mounted in a suitable guiding-tube 2 in tank S is a float 3, which is connected with the throttle-valve 4 of the cold-water pump K through the connecting-rod 5, link 6, arm 7, shaft 8, arm 9, link 10, and connecting-rod 11. Float 3 is also connected with the cut-off valves U and V through stops 12 and 13 on rod 5, lever 14, connecting-rod 15, and link W, the arrangement being such that when the hot-water tank is filled and the float is raised, as shown, the throttle-valve of pump K and the cut-off valve V are closed and valve U is open, so that the pump F, which supplies the boiler through pipe 16, is supplied wholly with condense-water from tank S, and when tank S is nearly emptied the float falls, thus raising connecting-rods 11 and 15 and opening throttle-valve 4 and cut-off valve V and closing cut-off valve U. The pump F is now supplied with heated and purified original feed-water, and pump K is put in operation, supplying original feed-water to well B until tank S becomes again supplied with condense-water, when pump K is automatically stopped, valve V closed, and valve U opened by the rising float, and pump F again draws its supply from the condense-water.

The original feed-water on passing into well B and the settling-chambers C is quickly heated by the exhaust-steam, and in passing through the settling-chambers deposits therein its impurities, which are afterward drawn off through valves e, as before described.

The exhaust-steam is wholly condensed and returned at nearly the temperature of steam and free from lime compounds to the boiler, thus effecting a great saving of fuel and preventing the formation of scale.

I claim as my invention—

1. The combination of the tank having the transverse partition and the central well formed in the lower part of the tank, a steam-supply pipe arranged to enter said tank below the transverse partition and to discharge into the space between the central well and the walls of the tank, the steam-discharge pipe leading from said space, the series of separate vessels arranged around said central well in said space with spaces between them through which the steam may circulate, one of said vessels being connected with the central well and the others connected in series therewith, substantially as described, a water-supply pipe arranged to enter the tank above the well, and a water-discharge pipe leading from the last of the series of vessels, all arranged to co-operate substantially as set forth.

2. In an apparatus for supplying pure water for boilers, the steam-condenser consisting of the series of condensing-chambers arranged in a connected series, one above another, the steam-supply pipe entering the lowermost of said chambers, the steam-discharge pipe leading from the uppermost of the chambers, the perforated expansion-chamber mounted on said discharge-pipe, the conical perforated deflectors arranged above said expansion-chamber, the condensing-hood arranged to inclose said deflectors, the drip-pan arranged beneath said deflectors and condensing-hood, the tank inclosing the condensing-chambers, the pipe connecting said tank and the drip-pan, and the overflow-pipe leading from the tank, all combined and arranged to co-operate substantially as and for the purpose set forth.

3. In an apparatus for supplying pure water for boilers, the combination, with a feed-water purifier consisting of a vessel adapted to hold the feed-water, and a steam-chamber inclosing said feed-water vessel, of the hot-water tank arranged to receive the condense-water from said steam-chamber, the float arranged in said hot-water tank, the hot-water pump, the pipe connecting said pump and tank and having a cut-off valve therein, the pipe connecting said pump and the feed-water vessel and having also a cut-off valve therein, the link connecting said valves so that the opening of one valve operates to close the other, and intermediate connecting mechanism connecting said link and the float in the tank, whereby said valves are operated by the rising and falling of the float and the pump is supplied, primarily, with condense-water from said hot-water tank, and, secondarily, from said feed-water vessel, substantially as and for the purpose set forth.

4. In an apparatus for supplying pure water for boilers, the combination, with a feed-water purifier consisting of a vessel adapted to hold the feed-water, and a steam-chamber inclosing said feed-water vessel, of the hot-water tank arranged to receive the condense-water from said steam-chamber, the float arranged in said hot-water tank, the hot-water pump, the pipe connecting said pump and tank and having a cut-off valve therein, the pipe connecting said pump and the feed-water vessel and having also a cut-off valve therein, the link connecting said valves so that the opening of one operates to close the other, intermediate connecting mechanism connecting said link and the float in the tank, whereby said valves are operated by the rising and falling of the float, the steam-operated cold-water pump, the pipe connected to said pump and arranged to convey the feed-water therefrom to the feed-water vessel, the throttle-valve of said cold-water pump, and intermediate connecting mechanism connecting said throttle-valve and the float in the hot-water tank, all arranged to co-operate substantially as shown and described, whereby the hot-water pump is supplied, primarily, with condense-water from the hot-water tank, and, secondarily, from said feed-water vessel, and the supply of original feed-water from the cold-water pump is automatically controlled, as set forth.

FRED. L. McGAHAN.

Witnesses:
H. P. HOOD,
A. M. HOOD.